(12) United States Patent
Zhuang

(10) Patent No.: US 12,450,929 B2
(45) Date of Patent: Oct. 21, 2025

(54) AUTO-LINE-DIVISION SYSTEM FOR HANDWRITING MANUSCRIPT FOR LINE-DIVISION OF A HANDWRITING MANUSCRIPT FROM AN ELECTRONIC HANDWRITING INPUT PANEL

(71) Applicant: Jian Ming Zhuang, Singapore (SG)

(72) Inventor: Jian Ming Zhuang, Singapore (SG)

(73) Assignee: SUNIA PTE. LTD, Singapore (SG)

( * ) Notice: Subject to any disclaimer, the term of this patent is extended or adjusted under 35 U.S.C. 154(b) by 327 days.

(21) Appl. No.: 18/215,824

(22) Filed: Jun. 29, 2023

(65) Prior Publication Data

US 2025/0005945 A1     Jan. 2, 2025

(51) Int. Cl.
*G06V 30/148* (2022.01)
*G06V 30/12* (2022.01)
*G06V 30/14* (2022.01)
*G06V 30/22* (2022.01)
*G06V 30/32* (2022.01)

(52) U.S. Cl.
CPC ............ *G06V 30/158* (2022.01); *G06V 30/12* (2022.01); *G06V 30/1437* (2022.01); *G06V 30/22* (2022.01); *G06V 30/347* (2022.01)

(58) Field of Classification Search
CPC .. G06V 30/158; G06V 30/12; G06V 30/1437; G06V 30/22; G06V 30/347; G06V 30/1478; G06V 30/1423; G06V 30/414; G06F 3/0484
See application file for complete search history.

(56) References Cited

U.S. PATENT DOCUMENTS

| | | | |
|---|---|---|---|
| 2008/0056579 A1* | 3/2008 | Guha | G06V 30/1423 382/187 |
| 2010/0104189 A1* | 4/2010 | Aravamudhan | G06V 30/36 382/187 |
| 2015/0131912 A1* | 5/2015 | Kasthuri | G06V 30/18019 382/202 |
| 2015/0346995 A1* | 12/2015 | Sugiura | G06V 30/373 715/863 |
| 2015/0356360 A1* | 12/2015 | Wimmer | G06V 30/2268 382/189 |
| 2022/0291828 A1* | 9/2022 | Minagawa | G06V 30/36 |

* cited by examiner

*Primary Examiner* — Huo Long Chen

(57) ABSTRACT

An auto-line-division system for handwriting manuscript for line-division of a handwriting manuscript from an electronic handwriting input panel is provided. Generally, in writing, various conditions will generate, such too large or too small words, isolation words, reversal strokes, etc. The system could process these problems in writing based on the setting of a standard line height and a standard line width. The edges and features in division of lines are detected and some values are calculated for correction of the line division so that efficiency of line division is promoted. Another, problems induced in the first line division is taken into consideration, and the problem of multiple lines due to mistake line division can be further correct to one single line. These problems could is corrected so as to promote the accuracy in line division.

10 Claims, 5 Drawing Sheets

AUTO-LINE-DIVISION SYSTEM FOR HANDWRITING MANUSCRIPT FOR LINE-DIVISION OF A HANDWRITING MANUSCRIPT FROM AN ELECTRONIC HANDWRITING INPUT PANEL

FIELD OF THE INVENTION

The present invention is related to line division of handwriting manuscripts, and in particular to a auto-line-division system for handwriting manuscript for line-division of a handwriting manuscript from an electronic handwriting input panel

BACKGROUND OF THE INVENTION

In conventional writing of an electronic writing panel, the handwriting texts are converted into computer texts and then arranged these texts line by line.

Division of handwriting texts is a technology which is mainly used to separate words and numbers in handwriting manuscripts which are used in computer recognition of handwriting texts and explains these texts so as to provide supports for mechanic learning and natural language processing. The main principle is to analyze shapes, sizes, structures, continuities, and other features of handwriting texts. Thereby, they are used to the recognition of each word based on discovered features.

For separation of handwriting texts, in current technologies, methods about deep learning, conventional computer visual sensitivity, and non-monitored leanings are widely used. The method based on deep learning used CNN (convolution neural network) with end-to-end function is used to real the work of work separation. In conventional computer visual sensitivity, completer image processing technologies are used to extract many features in handwriting texts, and then these features are used in classification and recognition based on figure separation. Non-monitoring learning is an image set without any label information or any-pre markup information, in that only a single image is used to perform the text separation.

The main claim of the present invention is to resolve the line separation for handwriting texts input from electronic writing panels. In fact, for handwriting texts, the orders of the strokes are not equal to the orders of texts in the handwriting manuscript due to the reasons of writing habits of the writers, and environmental effects in handwriting. Furthermore, the disorders of the strokes in the manuscripts all have affects. However, these problems will induce difficult in line separation.

SUMMARY OF THE INVENTION

Accordingly, the object of the present invention is to provide an auto-line-division system for handwriting manuscript for line-division of a handwriting manuscript from an electronic handwriting input panel, wherein generally, in writing, various conditions will generate, such too large or too small words, isolation words, reversal strokes, etc. The program of the present invention could process these problems in writing so that efficiency of line division is promoted. Another, problems induced in the first line division is taken into consideration, for example, the problem of multiple lines being divided into one single line. These problems could is corrected by the ways of the present invention so as to promote the accuracy in line division. The present invention realizes the line division of hand writing manuscript and have better result than those ways used in the prior arts.

To achieve above object, the present invention provides an auto-line-division system for handwriting manuscript for line-division of a handwriting manuscript from an electronic handwriting input panel; the system recording coordinates of each points of all strokes of the handwriting manuscript and generating time for each point; herein, direction of lines being a line direction (x direction) and different lines arranged along a y direction which is vertical to the x direction; the system including a mainframe; the mainframe including a processor, and a memory; the processor serving to perform operations needed; the memory serving to store computer programs used and data related; the system further comprising: a line height unit for calculating a standard height and a standard width of the manuscript; an abnormal delete unit connected to the line height unit, which receives the standard height and the standard width from the line height unit; the abnormal delete unit serving to delete abnormal strokes in the manuscript, wherein the abnormal stroke is defined that a height of one stroke is higher than a set time of the standard height, or the width of one stroke is wider than another set time of the standard width; a pre-division unit connected to the abnormal delete unit for receiving the manuscript which has been processed by the abnormal delete unit; wherein the pre-division unit serves to roughly divide the manuscript into several lines in advance along a y axis direction; for an original first line firstly detected, a leftmost edge in the original first line and a rightmost edge in this original first line are detected; then a height of a first set time of the standard height is used as a line height in division of the manuscript, this line height is used to divide the manuscript again to get a first line of the manuscript; for other portion of the manuscript, the same process is proceeded again and again to divide the manuscript into several lines; a special line unit connected to the pre-division unit for receiving the manuscript after dividing by the pre-division unit; in this special line unit, each isolation point and each reversal stroke are set as a single line, which are incorporated into another adjacent line in the following steps; an overlarge line division unit connected to the special line unit and the pre-division unit for receiving the manuscript processed by the special line unit; the overlarge line division unit serves to re-divide overlarge lines which have divided by the pre-division unit; the definition of the overlarge line is that for a line after divided by the pre-division unit, if the height (in y axis direction) of the line is greater than a second set time of the standard height, the line is considered as an overlarge line; a space incorporation unit connected to the overlarge line division unit for receiving the manuscript processed by the overlarge line division unit; wherein the space incorporation unit sere to assert whether the division of the normal line is correct; if it is considered incorrect, the normal line is deserted, while the original line before processed by the overlarge line division unit is accepted; for the lines formed by isolation points and reversal lines are also processed by the spaced incorporation unit for being incorporated into other lines; and a multiple line unit connected to the space incorporation unit for receiving the manuscript from the space incorporation unit; wherein the multiple line unit serves to calculate the distances between strokes of lines from the space incorporation unit; the distance is the distance from a rightmost end of a former stroke to a leftmost end of a latter stroke; if the distance is greater than a set width, the two strokes are viewed as boundaries, and the former and latter strokes are divided into different two lines; and the manuscript is line-divided by above ways.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
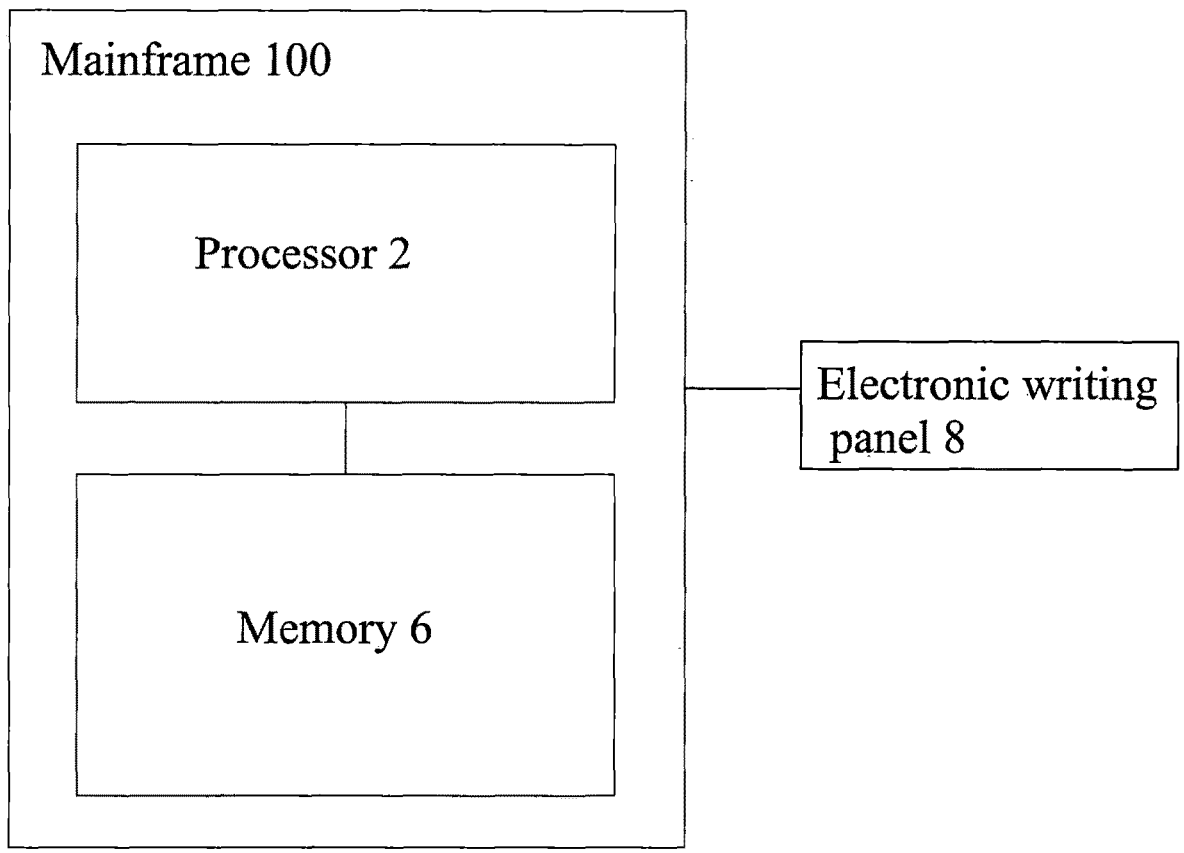
FIG. 1 shows the connection of the elements of the present invention.
Figure 2:
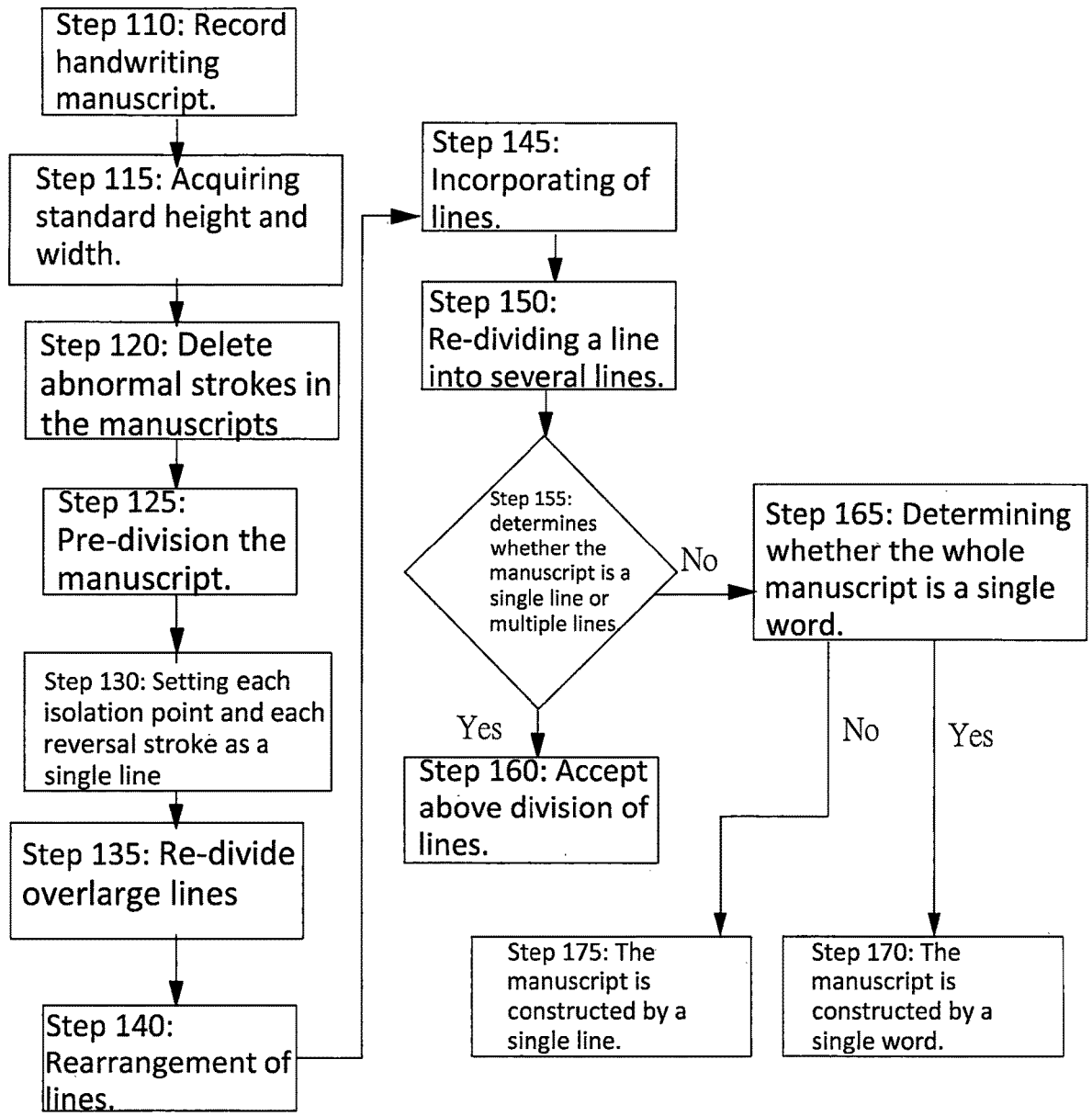
FIG. 2 is an operation flow diagram of the present invention.
Figure 3A:
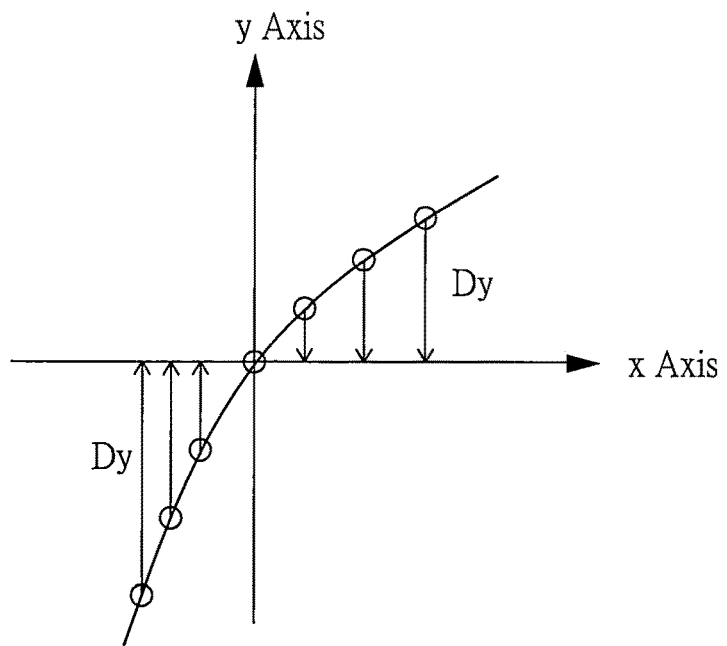
FIG. 3A shows one embodiment of the present invention showing the distances of the points of one stroke and the y axis.
Figure 3B:
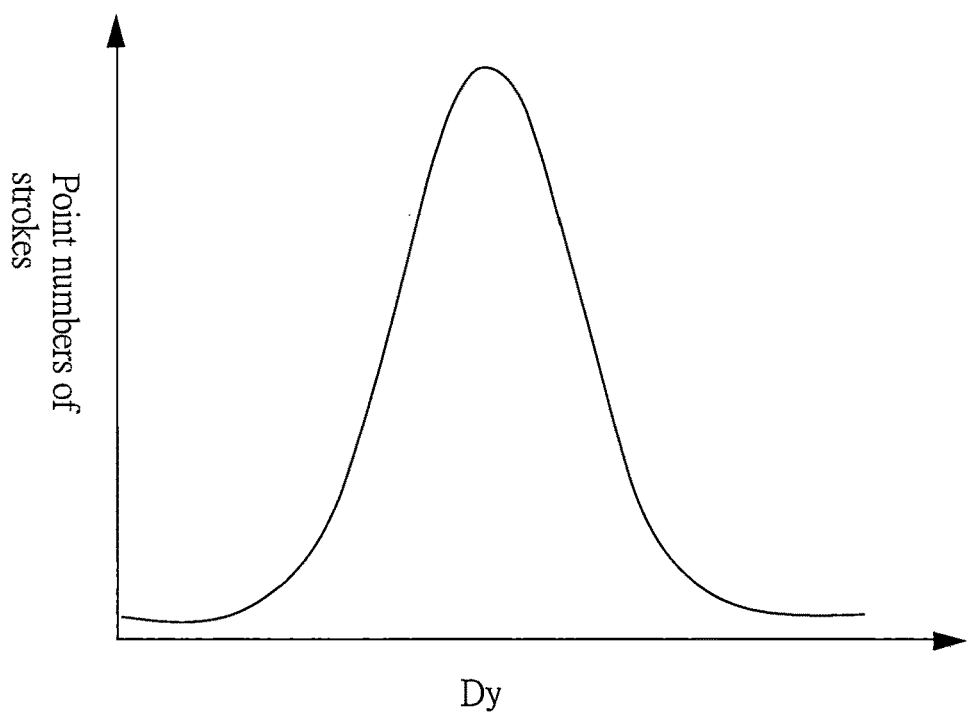
FIG. 3B shows the distribution between points of strokes of a manuscript with Dy.
Figure 4:
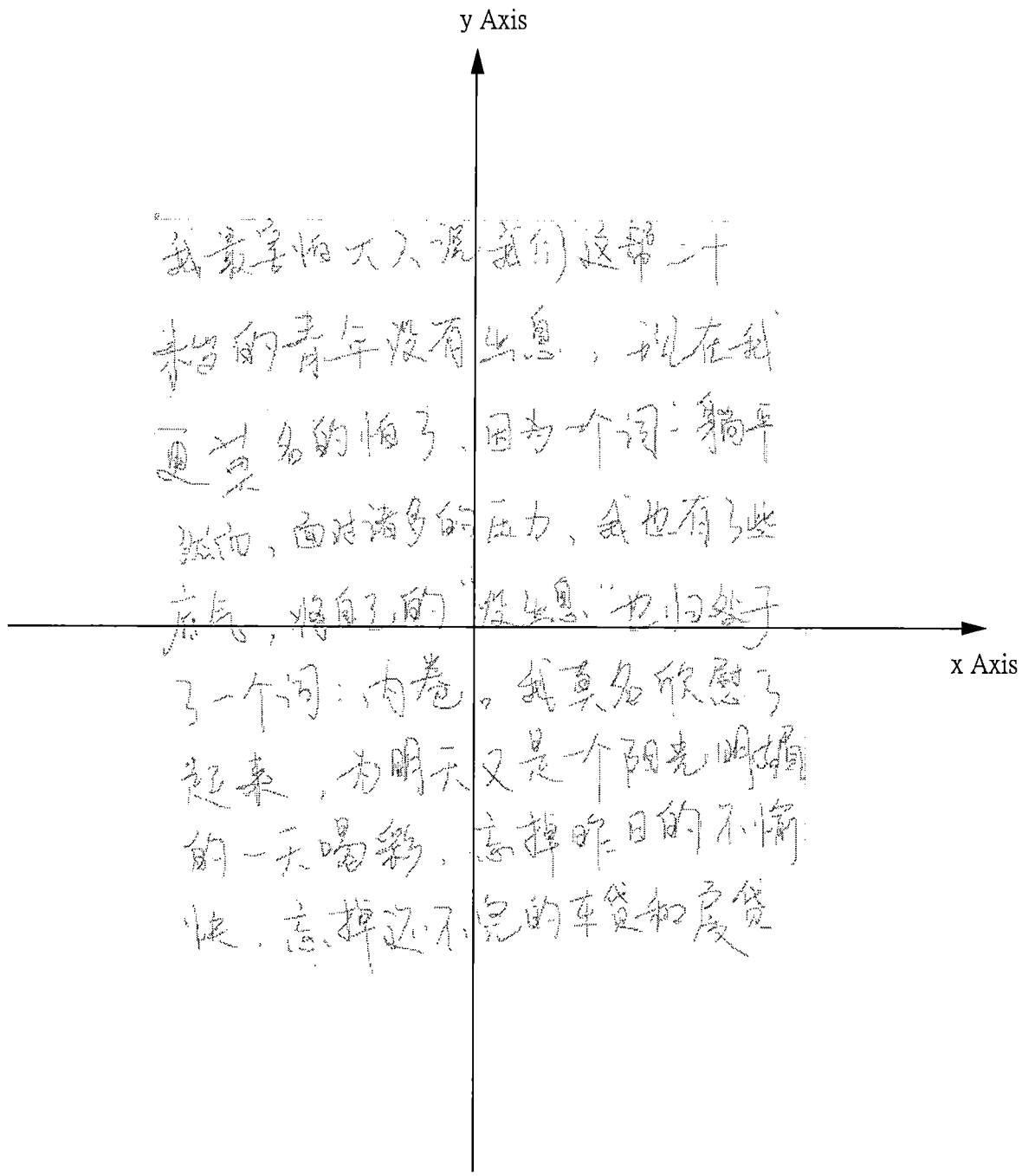
FIG. 4 is schematic view showing the directions of a manuscript.
Figure 5:
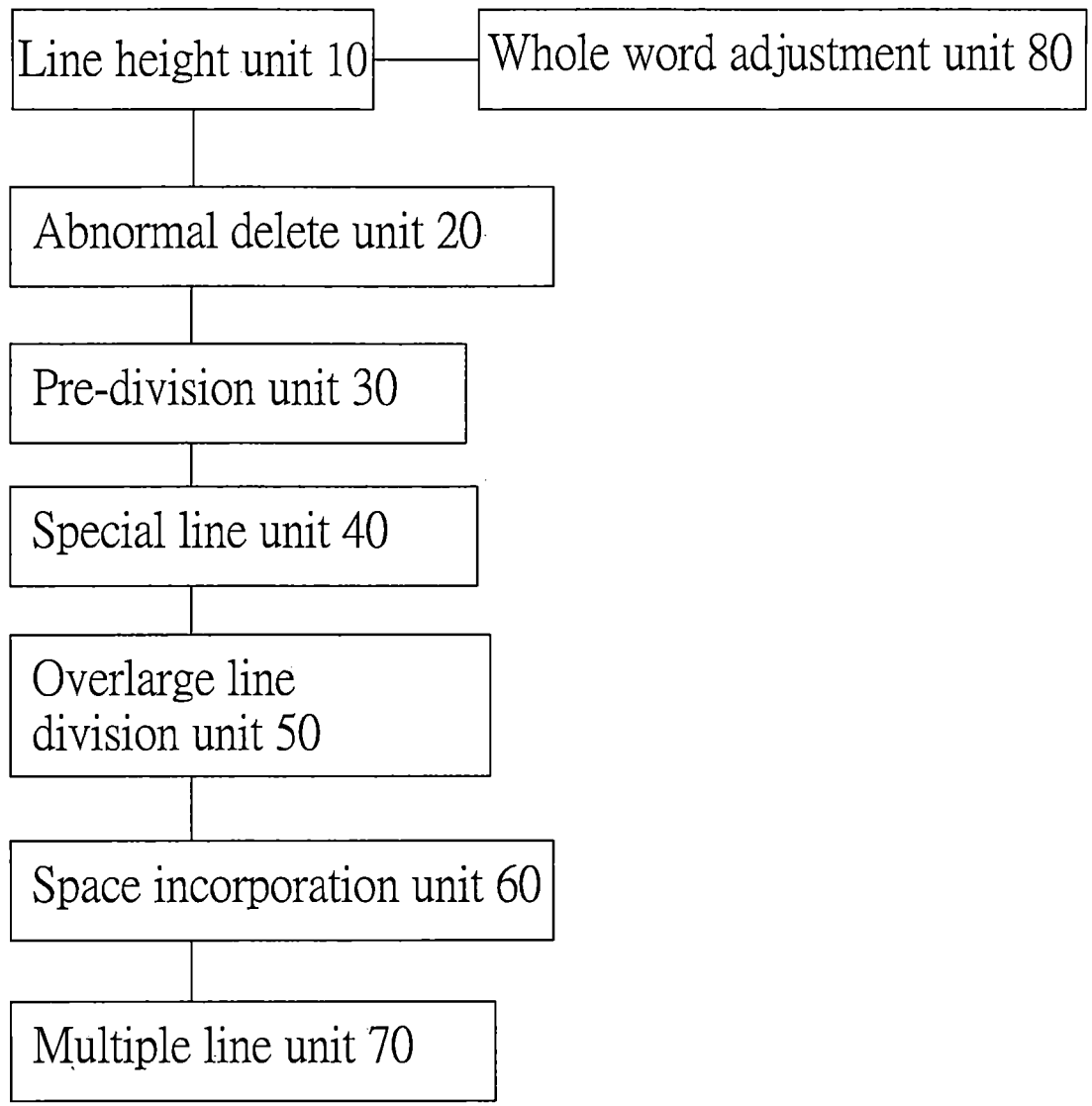
FIG. 5 is a block diagram showing the element connection of the present invention.

Referring to FIGS. 1 to 5, in the present invention, the manuscripts mean manuscripts which are inputted by a user from the electronic writing panels. The electronic writing panel 8 records each stroke (coordinates of the points forming the stroke) and the time for generating the points. Therefore, points forming each stroke and the input time of the points are recorded (step 110). In the following, the line direction is in the x axis of a coordinate. The lines are arranged from one line to a next line along the y axis, as illustrated in FIG. 4.

The structure of the present invention mainly includes a mainframe 100. The mainframe 100 includes a processor 2, and a memory 6. The processor 2 serves to perform operations needed in the present invention. The memory 6 serves to store computer programs used in the present invention and the data related in the present invention. All the results about the operation of the present invention and related data thereof are stored in the memory 6.

A line height unit 10 serves to arrange strokes of a manuscript in order based on heights of the strokes, and a selected height of all the heights based on a setting ratio of all the heights is set as a standard height. Similarly, the line height unit 10 serves to arrange strokes of a manuscript in order based on widths of the strokes, and a selected width of the widths based on a setting ratio of all the widths is set as a standard width. For example, a manuscript has 100 strokes, which are arranged in order based on heights of the strokes, and the 89th height of a stroke in the order of heights as the standard height; the 89th width of a stroke in the order of widths as the standard width (step 115).

An abnormal delete unit 20 is connected to the line height unit 10, which serves to receive the standard height and the standard width from the line height unit 10. The abnormal delete unit 20 serves to delete abnormal strokes in the manuscripts (step 120), wherein the abnormal stroke means the height of one stroke is higher than a set times of the standard height, or the width of one stroke is wider than a set times of the standard width. For example, the height of one stroke is higher than a 5 times of the standard height, then this stroke is deleted.

A pre-division unit 30 is connected to the abnormal delete unit 20 for receiving the manuscripts which has been processed by the abnormal delete unit 20. The pre-division unit 30 serves to roughly divide the manuscript into several lines in advance along a y axis direction. For an original first line firstly detected, a leftmost point in the original first line and a rightmost edge in this original first line are detected. Then a height of N1 times of the standard height is used as a line height in division of the manuscript, which line height is used to divide the manuscript again to get a first line of the manuscript. For other portion of the manuscript, the same process is proceeded again and again to divide the manuscript into several lines (step 125).

The condition of pre-division will be described herein.
Condition 1: a value obtained by a maximum x axis value of all strokes of a previous line subtracting a maximum x axis value of all strokes of a current line is greater than the standard height;
Condition 2: a value obtained by a minimum y axis value of a current processed stroke subtracting a maximum y axis value of all strokes of a current line is greater than 2 times of the standard height; and
Condition 3: a minimum y axis value of a current processed stroke is greater than a maximum y axis value of an offset matrix, wherein the offset matrix is defined as: for an Xmin of a minimum value of a current processed stroke in the x axis and an Xmax of a maximum value of the current processed stroke in the x axis, the offset matrix is a matrix formed by all strokes in the range of (Xmin, Xmax), in that, a maximum value of these strokes in y axis is smaller than the minimum value of current processed line in y axis.

If a stroke which satisfies the condition 1 and condition 3, or satisfied the condition 2 and condition 3, it is considered that the current processed stroke is belong to a next line.

For two continuous lines, calculating a different between a rightmost end of an upper line of the two continuous lines and a leftmost end of a next line of the two continuous line, which is used as a transversal different dx. For two continuous lines, calculates a different between a lowermost end of a first word in an upper line of the two continuous line and an uppermost end of a first word in a next line of the two continuous line, which is used as a longitudinal different dy. The transversal different dx must be greater than a set times of the standard width, for example, 5 times. The longitudinal different dy must be greater than zero. If the division of two lines matches to these conditions, the division of two lines is correct. The greater the offset in x axis of two lines, the accurate the division. If dx and dy do not match these conditions, it is considered that the two continuous lines are in fact a single line.

A special line unit 40 is connected to the pre-division unit 30 for receiving a manuscript after dividing by the pre-division unit 30. In this special line unit 40, each isolation point and each reversal stroke are set as a single line (step 130), which are incorporated into another adjacent line in the following steps.

The isolation point is defined as: a y axis distance Dy is obtained by a certain y value of one stroke in one manuscript subtracting the y value at a middle point for all points in one stroke which are arranged along the y axis. For all points of all strokes in the manuscripts, all the Dy are calculated, which are distributed as a normal distribution, as illustrated in FIGS. 3A and 3B. For one stroke, if all points in this stroke are at outer sides of 95.449974% of all the Dy (two standard deviations), than this stroke is viewed as an isolation point and is set as a single line.

In the input of the manuscript, the time sequence of all input points in the input strokes are recorded and thus the reversal stroke is defined as: for a set stroke, a difference between a lowermost point of the set stroke in y axis and an upmost point of a line containing the reversal stroke is greater than a set times N5 of the standard height, then the set stroke is called a reversal stroke.

An overlarge line division unit 50 is connected to the special line unit 40 and the pre-division unit 30 for receiving the manuscript processed by the special line unit 40. The overlarge line division unit 50 serves to re-divide overlarge lines (step 135) which have divided by the pre-division unit 30.

The definition of the overlarge line is that for a line after divided by the pre-division unit 30, if the height (in y axis direction) is greater than N2 times of the standard height, the line is considered as an overlarge line. Now a clustering algorithm (such as k-means algorithm) is used to perform the clustering operation based on y axis height of each stroke. All the strokes are clustered based on the y axis heights thereof. Then the results are analyzed for each strokes or words. Thereby, overlarge lines can be re-divided into several normal lines. The re-divided normal lines are re-arranged based on the orders in the manuscripts (step 140).

A space incorporation unit 60 is connected to the overlarge line division unit 50 for receiving the manuscript processed by the overlarge line division unit 50. The space incorporation unit 60 serves to calculate the transversal different dx and the longitudinal difference dy for above normal lines after processed by the overlarge line division unit 50 so as to assert whether the division of the normal line is correct. If it is considered incorrect, the normal line is deserted, while the original line before processed by the overlarge line division unit 50 is accepted (step 145).

For the lines formed by isolation points and reversal lines are also processed by the spaced incorporation unit 60 for being incorporated into other lines (step 140).

A multiple line unit 70 is connected to the space incorporation unit 60 for receiving the manuscript from the space incorporation unit 60. The multiple line unit 70 serves to calculate the distances between strokes of lines from the space incorporation unit 60. The distance is the distance from a rightmost end of a former stroke to a leftmost end of a latter stroke. If the distance is greater than a set width N7, the two strokes are viewed as boundaries, and the former and latter strokes are divided into different two lines (step 150).

A whole word adjustment unit 80 is connected to the line height unit 10 for receiving the standard height and standard width from the line height unit 10, and then the whole word adjustment unit 80 determines whether the manuscript has multiple lines (step 155). If it has multiple lines, above result of division of manuscript is accepted (step 160). If not multiple lines, it is determined to be a single word (step 165). The whole word adjustment unit 80 calculates height and width of the manuscript. If the height of the manuscript is only smaller than N3 times of the standard height or the width is only smaller than N4 times of the standard width, it is considered that the whole manuscript is only a single word. A ratio of the width to height of the manuscript can be also used as a standard for adjustment. For example, if the ratio of width to height is smaller than 2, it is considered that the whole manuscript is a single word (step 170). Otherwise, the whole manuscript is constructed by a single line (step 175).

A test unit serves for testing other manuscript.

In practical usage, the system will calculate the standard height and standard width. Abnormal strokes are detected and deleted for avoiding the abnormal strokes to affect the division and recognition of the words. The pre-division unit serves to roughly divide the manuscript into several lines. Isolation points and reversal lines are set as single lines in advance. Then overlarge lines are further divided into several normal lines. The normal lines are needed to be arranged and space incorporation. If the distances between words are overlarge, it will be re-divided into several lines so as to promote accuracy in division. Then it further checks whether the whole manuscript is a single word so as to assert whether another division way is necessary.

Advantages of the present invention are that generally, in writing, various conditions will generate, such too large or too small words, isolation words, reversal strokes, etc. The program of the present invention could process these problems in writing so that efficiency of line division is promoted. Another, problems induced in the first line division is taken into consideration, for example, the problem of multiple lines being divided into one single line. These problems could is corrected by the ways of the present invention so as to promote the accuracy in line division. The present invention realizes the line division of hand writing manuscript and have better result than those ways used in the prior arts.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An auto-line-division system for handwriting manuscript for line-division of a handwriting manuscript from an electronic handwriting input panel; the system recording coordinates of each points of all strokes of the handwriting manuscript and generating time for each point; herein, direction of lines being a line direction (x direction) and different lines arranged along a y direction which is vertical to the x direction; the system including a mainframe; the mainframe including a processor, and a memory; the processor serving to perform operations needed; the memory serving to store computer programs used and data related; the system further comprising:

a line height unit for calculating a standard height and a standard width of the manuscript;

an abnormal delete unit connected to the line height unit, which receives the standard height and the standard width from the line height unit; the abnormal delete unit serving to delete abnormal strokes in the manuscript, wherein the abnormal stroke is defined that a height of one stroke is higher than a set time of the standard height, or the width of one stroke is wider than another set time of the standard width;

a pre-division unit connected to the abnormal delete unit for receiving the manuscript which has been processed by the abnormal delete unit; wherein the pre-division unit serves to roughly divide the manuscript into several lines in advance along a y axis direction; for an original first line firstly detected, a leftmost edge in the original first line and a rightmost edge in this original first line are detected; then a height of a first set time of the standard height is used as a line height in division of the manuscript, this line height is used to divide the manuscript again to get a first line of the manuscript; for other portion of the manuscript, the same process is proceeded again and again to divide the manuscript into several lines;

a special line unit connected to the pre-division unit for receiving the manuscript after dividing by the pre-division unit; in this special line unit, each isolation point and each reversal stroke are set as a single line, which are incorporated into another adjacent line in the following steps;

an overlarge line division unit connected to the special line unit and the pre-division unit for receiving the manuscript processed by the special line unit; the overlarge line division unit serves to re-divide overlarge lines which have divided by the pre-division unit; the definition of the overlarge line is that for a line after divided by the pre-division unit, if the height (in y axis direction) of the line is greater than a second set time of the standard height, the line is considered as an overlarge line;

a space incorporation unit connected to the overlarge line division unit for receiving the manuscript processed by the overlarge line division unit;

wherein the space incorporation unit sere to assert whether the division of the normal line is correct; if it is considered incorrect, the normal line is deserted, while the original line before processed by the overlarge line division unit is accepted; for the lines formed by isolation points and reversal lines are also processed by the spaced incorporation unit for being incorporated into other lines;

a multiple line unit connected to the space incorporation unit for receiving the manuscript from the space incorporation unit; wherein the multiple line unit serves to calculate the distances between strokes of lines from the space incorporation unit; the distance is the distance from a rightmost end of a former stroke to a leftmost end of a latter stroke; if the distance is greater than a set width, the two strokes are viewed as boundaries, and the former and latter strokes are divided into different two lines; and the manuscript is line-divided by above ways.

2. The auto-line-division system for handwriting manuscript for line-division of a handwriting manuscript of an electronic handwriting input plate as claimed in claim 1, further comprising a whole word adjustment unit which is connected to the line height unit for receiving the standard height and standard width from the line height unit, and then the whole word adjustment unit determines whether the manuscript is a single line; and the whole word adjustment unit calculates height and width of the manuscript; if the height of the manuscript is only smaller than a fourth set times of the standard height or the width is only smaller than fifth set times of the standard width, it is considered that the whole manuscript is only a single word; a ratio of the width to height of the manuscript can be also used as a standard for adjustment.

3. The auto-line-division system for handwriting manuscript for line-division of a handwriting manuscript of an electronic handwriting input plate as claimed in claim 1, wherein the line height unit serves to arrange strokes of a manuscript in order based on heights of the strokes, and a selected height of all the heights based on a setting ratio of all the heights is set as a standard height, the line height unit serves to arrange strokes of a manuscript in order based on widths of the strokes, and a selected width of the widths based on a setting ratio of all the widths is set as a standard width.

4. The auto-line-division system for handwriting manuscript for line-division of a handwriting manuscript of an electronic handwriting input plate as claimed in claim 1, wherein conditions of pre-division are:

Condition 1: a value obtained by a maximum x axis value of all strokes of a previous line subtracting a maximum x axis value of all strokes of a current line is greater than the standard height;

Condition 2: a value obtained by a minimum y axis value of a current processed stroke subtracting a maximum y axis value of all strokes of a current line is greater than 2 times of the standard height; and Condition 3: a minimum y axis value of a current processed stroke is greater than a maximum y axis value of an offset matrix, wherein the offset matrix is defined as: for an Xmin of a minimum value of a current processed stroke in the x axis and an Xmax of a maximum value of the current processed stroke in the x axis, the offset matrix is a matrix formed by all strokes in the range of (Xmin, Xmax), in that, a maximum value of these strokes in y axis is smaller than the minimum value of current processed line in y axis;

if a stroke satisfies the condition 1 and condition 3, or satisfies the condition 2 and condition 3, it is considered that the current processed stroke is belong to a next line.

5. The auto-line-division system for handwriting manuscript for line-division of a handwriting manuscript of an electronic handwriting input plate as claimed in claim 1, wherein for two continuous lines, calculating a different between a rightmost end of an upper line of the two continuous lines and a leftmost end of a next line of the two continuous line, which is used as a transversal different dx; for two continuous lines, calculates a different between a lowermost end of a first word in an upper line of the two continuous line and an uppermost end of a first word in a next line of the two continuous line, which is used as a longitudinal different dy; the transversal different dx must be greater than a fifth set time of the standard width, the longitudinal different dy must be greater than zero; if the division of two lines matches to these conditions, the division of two lines is correct; the greater the offset in x axis of two lines, the accurate the division; if dx and dy do not match these conditions, it is considered that the two continuous lines are in fact a single line.

6. The auto-line-division system for handwriting manuscript for line-division of a handwriting manuscript of an electronic handwriting input plate as claimed in claim 1, wherein the isolation point is defined as: a y axis distance Dy is obtained by a certain y value of one stroke in one manuscript subtracting the y value at a middle point for all points in one stroke which are arranged along the y axis; for all points of all strokes in the manuscripts, all the Dy are calculated, which are distributed as a normal distribution, for one stroke, if all points in this stroke are at outer sides of 95.449974% of all the Dy (two standard deviations), than this stroke is viewed as an isolation point and is set as a single line.

7. The auto-line-division system for handwriting manuscript for line-division of a handwriting manuscript of an electronic handwriting input plate as claimed in claim 1, wherein the reversal stroke is defined as: for a set stroke, a difference between a lowermost point of the set stroke in y axis and an upmost point of a line containing the reversal stroke is greater than a sixth set time of the standard height, then the set stroke is called a reversal stroke.

8. The auto-line-division system for handwriting manuscript for line-division of a handwriting manuscript of an electronic handwriting input plate as claimed in claim 1, wherein a clustering algorithm is used to perform the clustering operation based on y axis height of each stroke; all the strokes are clustered based on the y axis heights thereof; then the results are analyzed for each strokes or words; thereby, overlarge lines are re-divided into several normal lines; the re-divided normal lines are re-arranged based on the orders in the manuscripts.

9. The auto-line-division system for handwriting manuscript for line-division of a handwriting manuscript of an electronic handwriting input plate as claimed in claim 1, wherein the re-divided normal lines are re-arranged based on the orders in the manuscripts.

10. The auto-line-division system for handwriting manuscript for line-division of a handwriting manuscript of an electronic handwriting input plate as claimed in claim 5, wherein the space incorporation unit serves to calculate the transversal different dx and the longitudinal difference dy for above normal lines after processed by the overlarge line division unit so as to assert whether the division of the normal line is correct; if it is considered incorrect, the normal line is deserted, while the original line before processed by the overlarge line division unit is accepted.

* * * * *